United States Patent
Rodek et al.

(10) Patent No.: US 6,883,350 B2
(45) Date of Patent: Apr. 26, 2005

(54) DEBITEUSE MADE OF CERAMIC FOR PLATE GLASS PRODUCTION

(75) Inventors: Erich Rodek, Mainz (DE); Wolfgang Muench, Bubenheim (DE); Carsten Weinhold, Clarks Summit, PA (US); Rudolf Singer, Engelstadt (DE)

(73) Assignee: Schott AG, Mainz (DE)

( * ) Notice: Subject to any disclaimer, the term of this patent is extended or adjusted under 35 U.S.C. 154(b) by 444 days.

(21) Appl. No.: 10/206,903

(22) Filed: Jul. 26, 2002

(65) Prior Publication Data

US 2003/0029198 A1 Feb. 13, 2003

(30) Foreign Application Priority Data

Aug. 3, 2001 (DE) .......................................... 101 38 198

(51) Int. Cl.[7] .............................................. C03B 15/06
(52) U.S. Cl. .......................................... 65/338; 65/344
(58) Field of Search ............................. 65/90, 193, 203, 65/325, 326, 337, 338, 344, 374.11, 374.12

(56) References Cited

U.S. PATENT DOCUMENTS

| | | | | |
|---|---|---|---|---|
| 1,529,086 A | * | 3/1925 | Quertinmont | 65/344 |
| 1,565,821 A | * | 12/1925 | Slingluff | 65/205 |
| 1,670,167 A | * | 5/1928 | Reece | 65/203 |
| 1,800,902 A | * | 4/1931 | Quertinmont | 65/338 |
| 1,818,205 A | * | 8/1931 | Drake | 65/202 |
| 1,826,006 A | * | 10/1931 | Kupferschmind | 65/338 |
| 2,111,860 A | * | 3/1938 | Kilian | 65/90 |
| 2,321,975 A | * | 6/1943 | Bishop et al. | 65/204 |
| 3,397,976 A | * | 8/1968 | Hynd | 65/344 |
| 3,473,911 A | * | 10/1969 | Stein | 65/325 |
| 3,533,771 A | * | 10/1970 | Flessa et al. | 65/172 |
| RE31,442 E | * | 11/1983 | Pfaender | 65/90 |

* cited by examiner

*Primary Examiner*—Sean Vincent
(74) *Attorney, Agent, or Firm*—Pauley Petersen & Erickson

(57) ABSTRACT

A hot forming unit or debiteuse for plate glass production, with a noble metal box or frame encompassed by and contained in a highly heat-resistant ceramic frame and having a drawing slot matched to a cross section of a plate glass sheet to be produced. The dimensional integrity of the drawing slot of the noble metal frame is assured because the ceramic frame is constructed of longitudinal components and lateral components, where the longitudinal components of the ceramic frame and the longitudinal legs of the noble metal box rest against one another and are held so that they can still move axially against each other in a limited fashion. The longitudinal legs of the noble metal box are held in a stretched position by tension springs.

20 Claims, 2 Drawing Sheets

DEBITEUSE MADE OF CERAMIC FOR PLATE GLASS PRODUCTION

BACKGROUND OF THE INVENTION

1. Field of the Invention

This invention relates to a hot forming unit, also know as a debiteuse, for plate glass production, with a noble metal box that is encompassed by and contained in a highly heat-resistant ceramic frame and has a drawing slot that is matched to the cross section of a plate glass sheet to be produced.

2. Description of Related Art

In the drawing of plate glass in a Fourcault process, hot forming units called debiteuses are used, which are made of ceramic or other fireproof materials and float on the molten glass because their density is lower than the density of the glass to be drawn, the glass being drawn upward through the debiteuse. In the text that follows, the term ceramic includes all suitable fireproof materials.

Even with horizontal drawing of plate glass, debiteuses of this type are used, which form a component of the melting apparatus, such as the melting end or the channel that adjoins the melting end. The debiteuses are of one or more ceramic components with a horizontally disposed drawing slot. The debiteuses are subject to a large amount of wear. In order to achieve a high degree of dimensional integrity of the drawing slot and a sufficiently long service life of the debiteuse, the debiteuses have a noble metal lining, for example a platinum or a platinum alloy, so that the lining is the only thing contacting the glass flowing through and therefore is the glass contact material. Thus, the lining is of a box-shaped form, a noble metal frame, which is inserted into the drawing slot and can also be directly heated electrically in order to prevent the glass flow from cooling prematurely.

The debiteuses that are lined with a noble metal frame, however, have one disadvantage that the base material of the forming unit and the noble metal lining have different thermal expansion behaviors, such as the noble metal lining has a greater linear thermal expansion than the base material, for example ceramic, of the hot forming unit.

This is disadvantageous, particularly when heating the hot forming unit and when there are changes in the processing temperature of the glass to be drawn. The greater linear thermal expansion of the noble metal lining in relation to the ceramic of the base material causes folds to appear in the lining inside the drawing slot, which not only cause glass defects, but also cause damage to the noble metal lining and lead to a more intense corrosion by the glass flow. This shortens the service life of the hot forming unit. A further disadvantage lies in the fact that the known debiteuses have a temperature distribution that is unfavorable for the drawing process and that cannot be individually adjusted.

SUMMARY OF THE INVENTION

One object of this invention is to provide an improved hot forming unit over the known type mentioned above, so that the drawing slot maintains a dimensional integrity during heating and when there are changes in the processing temperature of the glass to be drawn.

This object is achieved according to this invention by the ceramic frame being composed of longitudinal components and lateral components. The longitudinal components of the ceramic frame and the longitudinal legs of the noble metal box rest against one another and are held so that they can still move axially against each other in a limited fashion. The longitudinal legs of the noble metal box are held in a stretched position by tension springs.

With this design of the hot forming unit, the ceramic frame is subdivided into individual components so that the initial tension of the longitudinal legs of the noble metal frame can prevent the warping of the lining due to differing linear thermal expansions. The longitudinal legs of the noble metal frame can slide axially against the longitudinal components of the ceramic frame, in a limited fashion. The tension springs on the longitudinal legs of the noble metal frame hold the longitudinal legs constantly in a stretched position and consequently assure the dimensional integrity of the drawing slot, which is predetermined by the opening of the noble metal frame.

The lateral components of the ceramic frame can be simply secured because the lateral components of the ceramic frame are held in pocket-shaped lateral legs of the noble metal frame, which are open toward the outside and are affixed with their side legs to the longitudinal legs of the noble metal box.

In another embodiment the longitudinal legs and the side legs of the pocket-shaped lateral legs of the noble metal frame protrude as connecting elements from the lateral components of the ceramic frame. Then the noble metal frame can be heated directly and the tension springs can be affixed directly to the connecting elements.

The electrical insulation is easily achieved because supply lines for heating voltages are connected to the connecting elements. The connecting elements are connected to tension springs, which are connected in an electrically insulated fashion to a unit frame that contains and encompasses the ceramic frame.

In another embodiment, the longitudinal components of the ceramic frame are secured to at least one longitudinally aligned guide rod. Compression springs, which are supported against the ends of the longitudinal components of the ceramic frame, are supported against adjustable stops of the guide rods affixed in the unit frame. Then even if the longitudinal components of the ceramic frame fracture, no parts loosen from the assembled ceramic frame because the compression springs continue to hold them on the guide rods. The adjustable stops can be used to change and adjust the pressure exerted on the longitudinal components. This occurs in an extremely simple fashion because the ends of the guide rods protruding from the longitudinal components of the ceramic frame are embodied as threaded parts on which nuts can be adjusted as stops.

There are several possibilities for the direct heating of the noble metal frame; the longitudinal legs can also be fixed in various ways. Consequently, in one embodiment a separate heating voltage can be connected to the two connecting elements associated with each longitudinal leg of the noble metal box. The two heating voltages can be of equal or different magnitudes.

The supplying of current to the noble metal frame, however, can also be executed so that a heating voltage can only be connected to the connecting elements associated with the one longitudinal leg of the noble metal box or so that a heating voltage can only be connected to two diagonally opposed connecting elements of the noble metal box. Finally, there is a further possibility for supplying different currents to the circuits because at least the two longitudinal legs of the noble metal box are of noble metal strips of different thicknesses.

BRIEF DESCRIPTION OF THE DRAWINGS

This invention is explained in detail below in view of an exemplary embodiment shown in the drawings, wherein.

DESCRIPTION OF PREFERRED EMBODIMENTS

Figure 1:
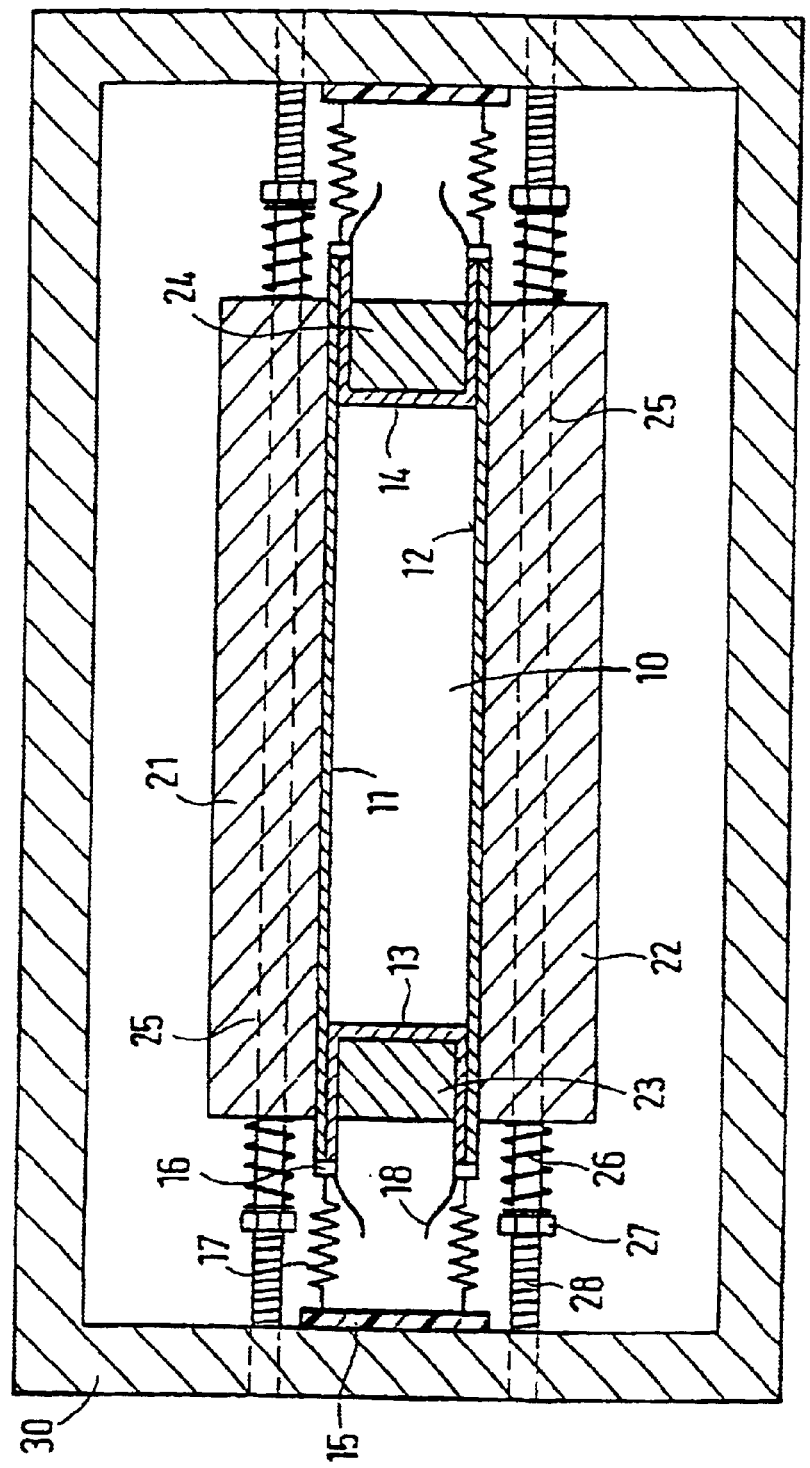
FIG. 1 shows a sectional view of a hot forming unit with a subdivided ceramic frame and a noble metal frame held in a stretched position for the drawing slot.

As the sectional view in FIG. 1 shows, a noble metal box or frame 10 defines the drawing slot. The opening of the noble metal frame 10 corresponds to the cross section of the plate glass sheet to be produced. This noble metal frame 10 comprises two longitudinal strips and two pocket-shaped brackets, which strips and brackets serve as longitudinal legs 11 and 12 and lateral legs 13 and 14. The lateral legs 13 and 14 are open toward the outside and accommodate separate lateral components 23 and 24 of the ceramic frame 20. The side legs of the lateral legs 13 and 14 are connected to the longitudinal slots 11 and 12 so that no glass flow can penetrate between them.

The longitudinal legs 11 and 12, together with the side legs of the lateral legs 13 and 14, form connecting elements 16, which protrude from the lateral components 23 and 24 of the ceramic frame 20. The connecting elements 16, which can also be embodied as separate parts connected to the noble metal frame 10, are attached to the supply lines 18 for the heating voltages. The connecting elements 16 are also engaged by tension springs 17, which hold the longitudinal legs 11 and 12 of the noble metal frame 10 in a stretched position, under a mechanical initial tension.

The tension springs 17 are connected by electrical insulation pieces 15 to a unit frame 30 which comprises metal and encompasses and contains the hot forming unit.

The longitudinal components 21 and 22 of the ceramic frame 20 rest against the outsides of the longitudinal legs 11 and 12 of the noble metal frame 10, but are not connected to them, thus allowing them to move axially against one another in a limited fashion. The longitudinal components 21 and 22 are secured to at least one guide rod 25. Compression springs 26 are supported at the ends of the longitudinal components 21 and 22, are secured to the guide rods 25, and are supported with their other ends against adjustable stops 27. The stops 27 are embodied as nuts and can be moved on the ends of the guide rods 25, which are embodied as threaded parts 28. The guide rods 25 are affixed in the unit frame 30. The longitudinal components 21 and 22 of the ceramic frame 20 are secured to the guide rods 25 even in the event of a fracture.

Naturally, other structural embodiments can be selected for exerting the tension on the longitudinal legs 11 and 12 of the noble metal frame 10 and for exerting the compression on the longitudinal components 21 and 22 of the ceramic frame 20 as well as for containing the lateral components 23 and 24 of the ceramic frame 20, without going beyond the scope and application field of the this invention.

Figure 2:
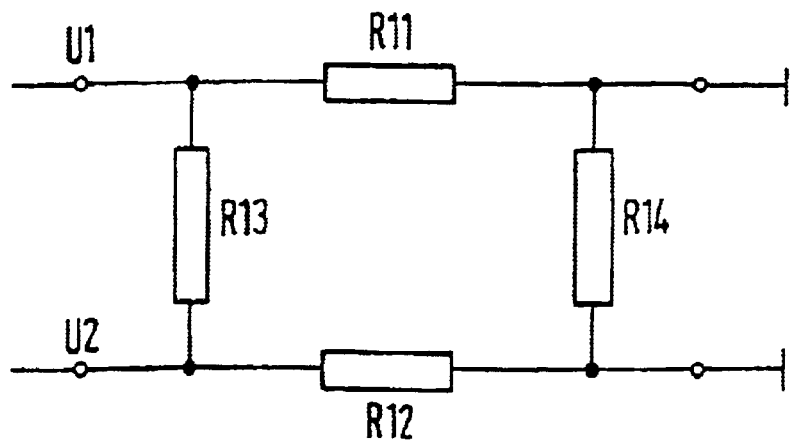
FIGS. 2 to 4 each show one of three different current supply embodiments for the noble metal frame.
Figure 3:
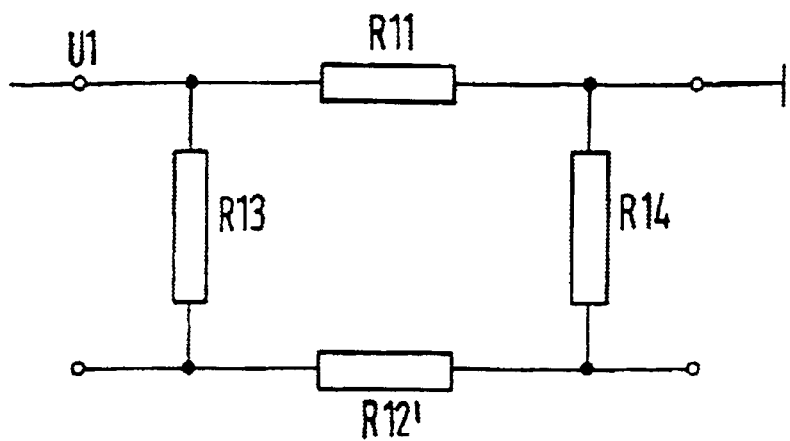
Figure 4:
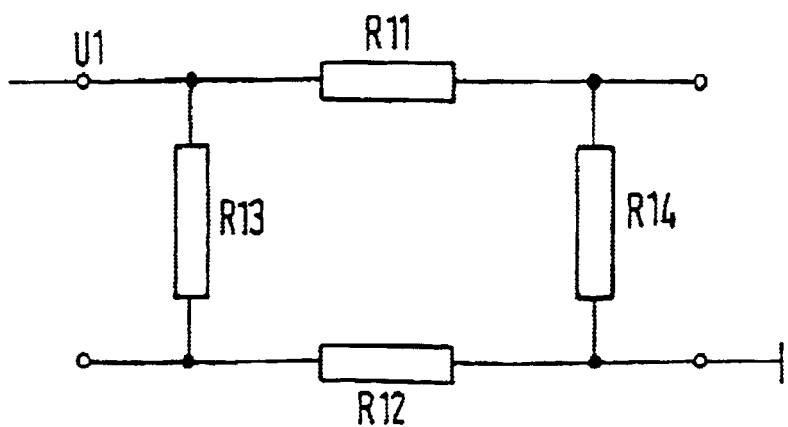

As shown in FIGS. 2 to 4, the electrical equivalent circuit diagram of the noble metal frame 20 comprises four resistances connected in the form of a frame, where the resistances R11 and R12 are essentially defined by the longitudinal legs 11 and 12 of the noble metal frame 10 and the resistances R13 and R14 are essentially defined by the pocket-shaped lateral legs 13 and 14 of the noble metal frame 10. If in the power supply arrangement according to FIG. 1, two heating voltages U1 and U2 are used, which are embodied at the connecting elements 16 associated with the two longitudinal legs 11 and 12, then the heating currents are equivalent if R11=R12, R13=R14, and U1=U2. If different magnitude heating voltages U1 and U2 are used, then the heating currents in the two branches can be selected to be of different magnitudes.

In another embodiment, noble metal strips of different thicknesses are used at least for the longitudinal legs 11 and 12 of the noble metal frame 10. This is shown in FIG. 2 by the resistances R11 and R12'. With a greater thickness of the longitudinal leg 12, the resistance R12' is less than the resistance R11. If a heating voltage U1 is present in the longitudinal leg 11, then a corresponding selection of the thickness of the longitudinal leg 12 permits the following equation to be achieved: R11=R13+R12'+R14, such as the same magnitude of current flows through the longitudinal legs 11 and 12.

As shown in FIG. 3, this can also be achieved by a diagonal connection of the heating current U1, when R11+R14=R13+R12.

It is thus clear that there are various possibilities for individually supplying current and heat to the noble metal frame 10, which can be used on a case-by-case basis.

German Patent Reference 101 38 198.0, the priority document corresponding to this invention, and its teachings are incorporated, by reference, into this specification.

What is claimed is:

1. In a hot forming unit or debiteuse for plate glass production, with a noble metal box encompassed by and contained in a highly heat-resistant ceramic frame and having a drawing slot matched to a cross section of a plate glass sheet to be produced, the improvement comprising:

the ceramic frame (20) having longitudinal components (21, 22) and lateral components (23, 24), the longitudinal components (21, 22) of the ceramic frame (20) and the longitudinal legs (11, 12) of the noble metal box (10) resting against one another and held axially moveable against each other in a limited fashion, and the longitudinal legs (11, 12) of the noble metal box (10) held in a stretched position by tension springs (17).

2. In the hot forming unit according to claim 1, wherein the lateral components (23, 24) of the ceramic frame (20) are held in pocket-shaped lateral legs (13, 14) of the noble metal frame (10) which are open toward an outside and are affixed with side legs to the longitudinal legs of the noble metal box.

3. The hot forming unit according to claim 2, wherein the longitudinal legs (11, 12) and the side legs of the pocket-shaped lateral legs (13, 14) of the noble metal box (10) protrude as connecting elements (16) from the lateral components (23, 24) of the ceramic frame (20).

4. In the hot forming unit according to claim 3, wherein supply lines (18) for heating voltages (U1, U2) are connected to the connecting elements (16) and the connecting elements (16) are connected to the tension springs (17) which are connected in an electrically insulated fashion to a unit frame (30) that contains and encompasses the ceramic frame (20).

5. In the hot forming unit according to claim 4, wherein longitudinal components (21, 22) of the ceramic frame (20) are secured to at least one longitudinally aligned guide rod (25) and compression springs (26) are supported against ends of the longitudinal components (21, 22) of the ceramic frame (20) and are also supported against adjustable stops (27) of the at least one guide rod (25) which are affixed in the unit frame (30).

6. In the hot forming unit according to claim 5, wherein ends of the guide rods (25) protruding from the longitudinal components (21, 22) of the ceramic frame (20) are threaded parts (28) on which nuts can be adjusted as stops (27).

7. In the hot forming unit according to claim 6, wherein a separate heating voltage (U1, U2) is connected to the two connecting elements (16) associated with each of the longitudinal legs (11, 12) of the noble metal box (10).

8. In the hot forming unit according to claim 7, wherein the heating voltages (U1, U2) are selected as one of equal and different magnitudes.

9. In the hot forming unit according to claim 6, wherein one of the heating voltages (U1 or U2) can only be connected to the connecting elements (16) associated with one of the longitudinal legs (11 or 12) of the noble metal box (10).

10. In the hot forming unit according to claim 6, wherein one of the heating voltages (U1 or U2) can only be connected to two diagonally opposed connecting elements (16) of the noble metal box (10).

11. In the hot forming unit according to claim 10, wherein at least the two longitudinal legs (11, 12) of the noble metal box (10) are of noble metal strips of different thicknesses.

12. The hot forming unit according to claim 1, wherein the longitudinal legs (11, 12) and side legs of pocket-shaped lateral legs (13, 14) of the noble metal box (10) protrude as connecting elements (16) from the lateral components (23, 24) of the ceramic frame (20).

13. In the hot forming unit according to claim 12, wherein supply lines (18) for heating voltages (U1, U2) are connected to the connecting elements (16) and the connecting elements (16) are connected to the tension springs (17) which are connected in an electrically insulated fashion to a unit frame (30) that contains and encompasses the ceramic frame (20).

14. In the hot forming unit according to claim 1, wherein longitudinal components (21, 22) of the ceramic frame (20) are secured to at least one longitudinally aligned guide rod (25) and compression springs (26) are supported against ends of the longitudinal components (21, 22) of the ceramic frame (20) and are also supported against adjustable stops (27) of the at least one guide rod (25) which are affixed in the unit frame (30).

15. In the hot forming unit according to claim 14, wherein ends of the guide rods (25) protruding from the longitudinal components (21, 22) of the ceramic frame (20) are threaded parts (28) on which nuts can be adjusted as stops (27).

16. In the hot forming unit according to claim 1, wherein a separate heating voltage (U1, U2) is connected to two connecting elements (16) associated with each of the longitudinal legs (11, 12) of the noble metal box (10).

17. In the hot forming unit according to claim 16, wherein the heating voltages (U1, U2) are selected as one of equal and different magnitudes.

18. In the hot forming unit according to claim 1, wherein a heating voltage (U1 or U2) can only be connected to connecting elements (16) associated with one of the longitudinal legs (11 or 12) of the noble metal box (10).

19. In the hot forming unit according to claim 1, wherein a heating voltage (U1 or U2) can only be connected to two diagonally opposed connecting elements (16) of the noble metal box (10).

20. In the hot forming unit according to claim 1, wherein at least the two longitudinal legs (11, 12) of the noble metal box (10) are of noble metal strips of different thicknesses.

* * * * *